United States Patent
Cardona et al.

(10) Patent No.: US 9,063,928 B2
(45) Date of Patent: Jun. 23, 2015

(54) PROCESSING DATA PACKETS FROM A RECEIVE QUEUE IN A REMOTE DIRECT MEMORY ACCESS DEVICE

(75) Inventors: Omar Cardona, Cedar Park, TX (US);
Andres Herrera, Austin, TX (US);
Pedro V. Torres, Pflugerville, TX (US);
Rafael Velez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 13/547,846

(22) Filed: Jul. 12, 2012

(65) Prior Publication Data

US 2014/0019571 A1    Jan. 16, 2014

(51) Int. Cl.
*G06F 13/28* (2006.01)
*H04L 12/875* (2013.01)

(52) U.S. Cl.
CPC .............. *G06F 13/28* (2013.01); *H04L 47/56* (2013.01)

(58) Field of Classification Search
CPC ..... H04L 69/16; H04L 69/161; H04L 69/163;
H04L 69/12; H04L 12/5693; H04L 49/90;
H04L 49/901; H04L 49/9094; H04L 47/56;
G06F 11/1471; G06F 11/3409; G06F 11/3476;
G06F 2201/815; G06F 2201/86; G06F 9/45;
G06F 13/28
See application file for complete search history.

(56) References Cited

U.S. PATENT DOCUMENTS

| | | | |
|---|---|---|---|
| 7,401,169 B2 * | 7/2008 | Holbrook | 710/52 |
| 7,603,475 B2 * | 10/2009 | Yang et al. | 709/235 |
| 8,122,155 B1 | 2/2012 | Marti | |
| 8,671,152 B2 * | 3/2014 | Horie et al. | 709/212 |
| 2004/0010612 A1 | 1/2004 | Pandya | |
| 2004/0030770 A1 | 2/2004 | Pandya | |
| 2004/0037319 A1 | 2/2004 | Pandya | |
| 2006/0045108 A1 | 3/2006 | Blackmore et al. | |
| 2006/0256784 A1 | 11/2006 | Feng et al. | |
| 2008/0126509 A1 | 5/2008 | Subramanian et al. | |
| 2010/0180033 A1 * | 7/2010 | Abdelal et al. | 709/226 |
| 2011/0167134 A1 * | 7/2011 | Freimuth et al. | 709/219 |

OTHER PUBLICATIONS

Cardona et al., "Processing Data Packets from a Receive Queue in a Remote Direct Memory Access Device," U.S. Appl. No. 14/082,244, filed Nov. 18, 2013, 37 pages.

* cited by examiner

*Primary Examiner* — Anthony Mejia
*Assistant Examiner* — Joseph M Cousins
(74) *Attorney, Agent, or Firm* — Yee & Associates, P.C.;
Damion Josephs (57) ABSTRACT

Processing data packets from a receive queue is provided. It is determined whether packets are saved in a pre-fetched queue. In response to determining that packets are not saved in the pre-fetched queue, a number of packets within the receive queue is determined. In response to determining the number of packets within the receive queue, it is determined whether the number of packets within the receive queue is greater than a number of packets called for by an application. In response to determining that the number of packets within the receive queue is greater than the number of packets called for by the application, an excess number of packets that is above the number of packets called for by the application is saved in the pre-fetched queue. An indication is sent to the application of the excess number of packets. The predetermined number of packets is transferred to the application.

7 Claims, 7 Drawing Sheets

PROCESSING DATA PACKETS FROM A RECEIVE QUEUE IN A REMOTE DIRECT MEMORY ACCESS DEVICE

BACKGROUND

1. Field

The disclosure relates generally to a computer implemented method, data processing system, and computer program product for processing data packets from a receive queue in a remote direct memory access device, such as a network input/output adapter.

2. Description of the Related Art

In high-speed networking and in high-performance computing environments, remote direct memory access (RDMA) is expected to become increasingly invaluable. For example, data centers and server farms will rely on remote direct memory access to coordinate computing devices connected by networks running packet protocols, such as transmission control protocol (TCP). In computing, remote direct memory access is a direct memory access from the user application memory of one data processing system into the user application memory of another data processing system without involving either data processing system's operating system. As a result, remote direct memory access supports zero-copy networking by enabling a network input/output adapter to transfer data directly to or from user application memory, eliminating the need to copy data between user application memory and the data buffers in the operating system. Such transfers require little to no work to be done by central processing units (CPUs), caches, or context switches, and transfers may continue in parallel with other system operations. When an application performs a remote direct memory access Read or Write request, the application data is delivered directly to the network, reducing latency and enabling faster data transfer. This permits high-throughput, low-latency networking, which is especially useful in massively parallel computer clusters.

SUMMARY

According to one embodiment of the present invention, a computer implemented method for processing data packets from a receive queue is provided. A data processing system determines whether packets are saved in a pre-fetched queue from a previous packet retrieval cycle. In response to the data processing system determining that packets are not saved in the pre-fetched queue from the previous packet retrieval cycle, the data processing system determines a current number of packets within the receive queue ready to be retrieved. In response to the data processing system determining the current number of packets within the receive queue ready to be retrieved, the data processing system determines whether the current number of packets within the receive queue ready to be retrieved is greater than a predetermined number of packets called for by an application of the data processing system. In response to the data processing system determining that the current number of packets within the receive queue ready to be retrieved is greater than the predetermined number of packets called for by the application, the data processing system saves an excess number of packets that is above the predetermined number of packets called for by the application in the pre-fetched queue for a subsequent packet retrieval cycle. In addition, the data processing system sends an indication to the application of the excess number of packets saved in the pre-fetched queue for a subsequent packet retrieval cycle. Further, the data processing system transfers the predetermined number of packets called for by the application to the application from the receive queue. In other embodiments of the present invention, a data processing system and a computer program product for processing data packets from a receive queue are provided.

DETAILED DESCRIPTION

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
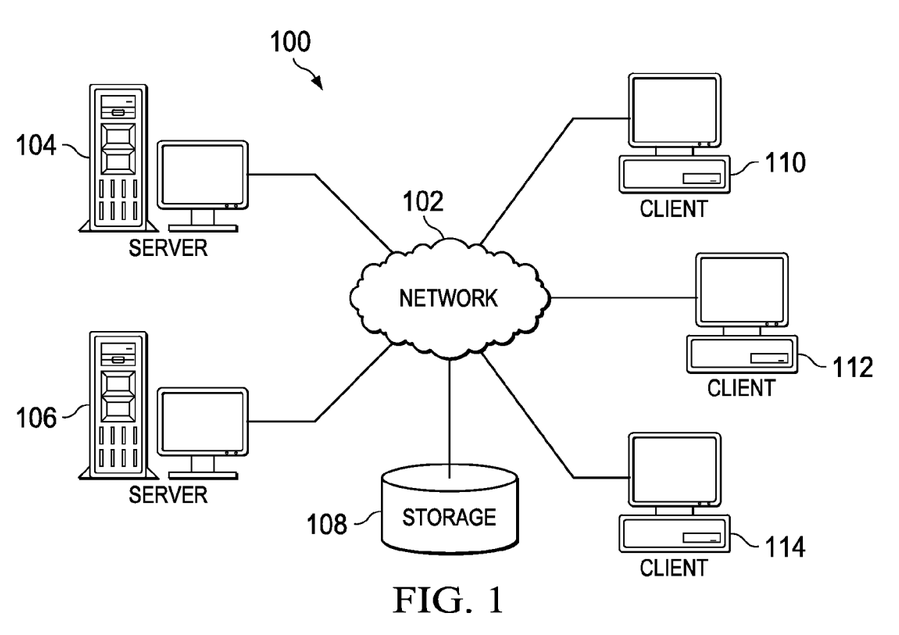
FIG. 1 is a pictorial representation of a network of data processing systems in which illustrative embodiments may be implemented.
Figure 2:
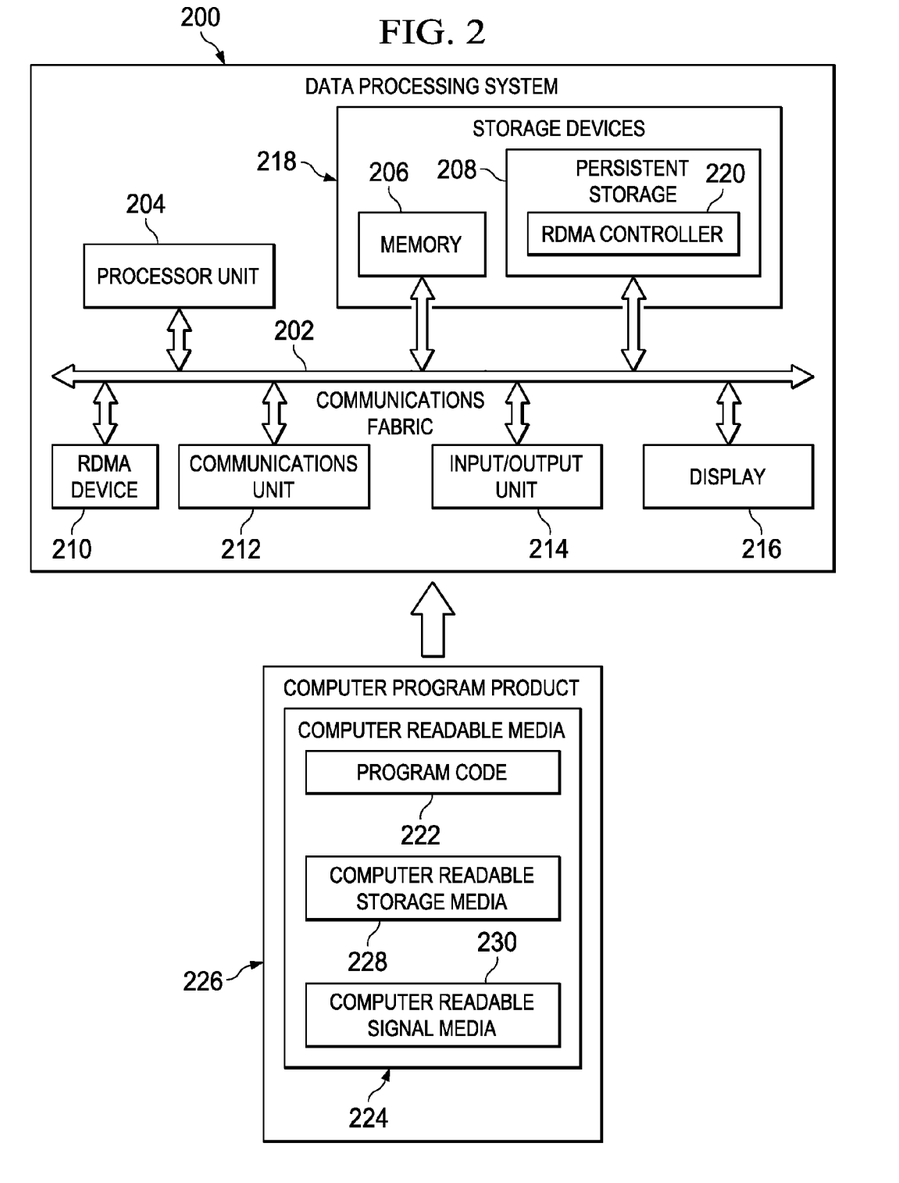
FIG. 2 is a diagram of a data processing system in which illustrative embodiments may be implemented.
Figure 3:
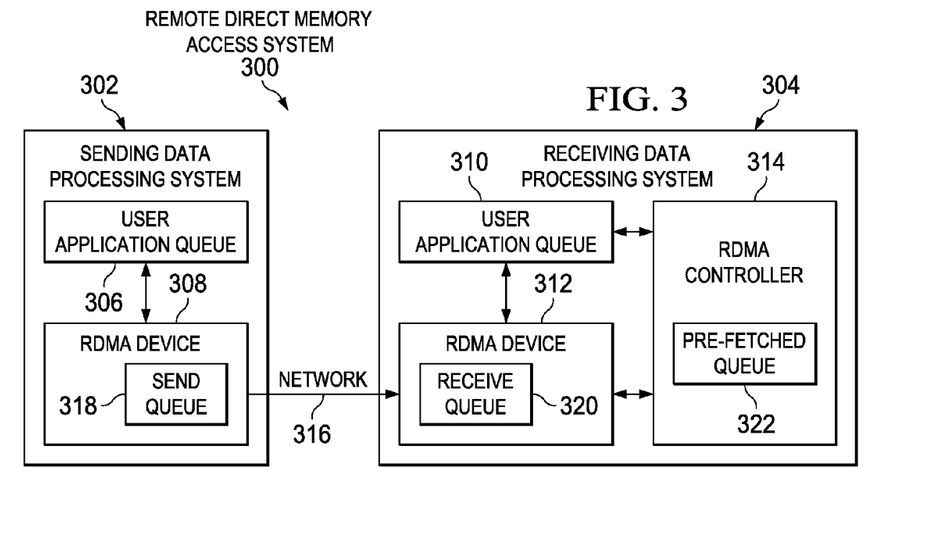
FIG. 3 is a diagram illustrating an example of sending data packets from a sending data processing system to a receiving data processing system using remote direct memory access in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other various devices connected together within network data processing system 100. Network 102 may include connections, such as wire, wireless communication links, or fiber optic cables. In addition, network 102 may transmit data at a speed of, for example, ten gigabits per second or higher.

In the depicted example, server 104 and server 106 connect to network 102, along with storage unit 108. Server 104 and server 106 are server computer devices with high speed connections to network 102. In addition, server 104 and server 106 may provide, for example, data feed services, such as financial, news, sports, gaming, or any other type of data feed service that streams updated data on a real time basis, to a plurality of client devices. However, it should be noted that server 104 and server 106 may provide any type of data to client devices. Storage unit 108 is a network storage device capable of storing data in a structured or unstructured format.

Clients 110, 112, and 114 also connect to network 102. Clients 110, 112, and 114 are clients to server 104 and/or server 106. In the depicted example, server 104 and server 106 may provide information, such as boot files, operating system images, and applications to clients 110, 112, and 114. Clients 110, 112, and 114 are data processing systems, such as, for example, network computers, personal computers, laptop computers, handheld computers, personal digital assistants, smart phones, or gaming devices. Users may utilize clients 110, 112, and 114 to receive and view data provided by server 104 and/or server 106.

Further, server 104 and server 106 may transfer data between server 104 and server 106 and/or transfer data to clients 110, 112, and 114 using a remote direct memory access protocol, such as InfiniBand, remote direct memory access-over-Ethernet, remote direct memory access-over-internet protocol (IP), virtual interface (VI), or any other type of remote direct memory access protocol. For example, server 104 may use a remote direct memory access device, such as a network input/output (I/O) adapter, to transfer data directly into a user application queue in a system memory address space of client 110 from a system memory address space of server 104, without utilizing a central processing unit. The system memory address space may include, for example, internal random access memory (RAM) and/or a larger scale external direct access storage device, such as storage 108. Furthermore, it should be noted that network data processing system 100 may include additional server devices, client devices, and other devices not shown.

Program code located in network data processing system 100 may be stored on a computer recordable storage medium and downloaded to a computer or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, remote direct memory access device 210, communications unit 212, input/output (I/O) unit 214, and display 216.

Processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 218. A storage device is any piece of hardware that is capable of storing information, such as, for example, without limitation, data, program code in functional form, and/or other suitable information either on a transient basis and/or a persistent basis. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores remote direct memory access controller 220. Remote direct memory access controller 220 is a remote direct memory access software program. Data processing system 200 uses remote direct memory access controller 220 to monitor and control remote direct memory access operations associated with remote direct memory access device 210.

Remote direct memory access device 210 is a hardware component that connects data processing system 200 to a network, such as network 102 in FIG. 1. Remote direct memory access device 210 may be, for example, a network input/output card, a network input/output adapter, a network interface card, or a network interface controller. In addition, remote direct memory access device 210 includes a set of one or more processors that provide the data processing capabilities of remote direct memory access device 210. Further, remote direct memory access device 210 allows for directly accessing data in user application memory on a remote data processing system in which data processing system 200 specifies the specific address location within the user application memory corresponding to the data to be accessed and transferred. Also, remote direct memory access device 210 allows the direct transfer of the data from the remote data processing system into specific address locations within memory 206 without interrupting the processing of processor unit 204.

Remote direct memory access device 210 includes a queue pair (QP). The queue pair comprises a send queue and a receive queue. Each queue includes a plurality of buffers. For example, a queue may include 32,000 buffers. Each buffer in the plurality of buffers may store one data packet or data element. A buffer is a region of a physical memory storage used to temporarily store data while the data is being moved from one location to another. In other words, the receive queue is a staging area for currently received data packets within remote direct memory access device 210 before remote direct memory access controller 220 transfers a predetermined number of data packets called for by a particular application running on data processing system 200 to memory 206 from the receive queue. The predetermined number of data packets called for by the particular application may be, for example, 128 data packets. However, it should be noted that an application may call for any number of data packets from the receive queue.

A queue pair is present on each of two communicating remote direct memory access devices that are located on two different data processing systems. A remote direct memory access connection comprises communication between queue pairs, instead of between ports. For example, a data transmission operates to transmit data packets directly from a send queue of a remote direct memory access device associated with a sending data processing system to a receive queue of a remote direct memory access device associated with a receiving data processing system via a network without involvement of the operating system of either the sending or receiving data processing system. Generally, not involving the operating system is known as kernel bypass, which permits high-throughput and low-latency networking.

Communications unit 212, in this example, also provides for communication with other data processing systems or devices. Communications unit 212 may be, for example, a modem. However, it should be noted that communications unit 212 may provide communications through the use of either or both physical and wireless communications links.

Input/output unit 214 allows for the input and output of data with other devices that may be connected to data processing system 200. For example, input/output unit 214 may provide a connection for user input through a keyboard, a mouse, and/or some other suitable input device. Further, input/output unit 214 may send output to a printer. Display 216 provides a mechanism to display information to a user.

Instructions for the operating system, applications, and/or programs may be located in storage devices 218, which are in communication with processor unit 204 through communications fabric 202. In this illustrative example, the instructions are in a functional form on persistent storage 208. These instructions may be loaded into memory 206 for running by processor unit 204 and remote direct memory access device 210.

The processes of the different embodiments may be performed by remote direct memory access device 210 using computer implemented instructions, which may be located in a memory, such as memory 206. These instructions are referred to as program code, computer usable program code, or computer readable program code that may be read and run by remote direct memory access device 210. The program code, in the different embodiments, may be embodied on different physical or computer readable storage media, such as memory 206 or persistent storage 208.

Program code 222 is located in a functional form on computer readable media 224 that is selectively removable and may be loaded onto or transferred to data processing system 200 for running by processor unit 204 and remote direct memory access device 210. Program code 222 and computer readable media 224 form computer program product 226. In one example, computer readable media 224 may be computer readable storage media 228 or computer readable signal media 230. Computer readable storage media 228 may include, for example, an optical or magnetic disc that is inserted or placed into a drive or other device that is part of persistent storage 208 for transfer onto a storage device, such as a hard drive, that is part of persistent storage 208. Computer readable storage media 228 also may take the form of a persistent storage, such as a hard drive, a thumb drive, or a flash memory that is connected to data processing system 200. In some instances, computer readable storage media 228 may not be removable from data processing system 200.

Alternatively, program code 222 may be transferred to data processing system 200 using computer readable signal media 230. Computer readable signal media 230 may be, for example, a propagated data signal containing program code 222. For example, computer readable signal media 230 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 222 may be downloaded over a network to persistent storage 208 from another device or data processing system through computer readable signal media 230 for use within data processing system 200. For instance, program code stored in a computer readable storage media in a server data processing system may be downloaded over a network from the server to data processing system 200. The data processing system providing program code 222 may be a server computer, a client computer, or some other device capable of storing and transmitting program code 222.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 224 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

During the course of developing illustrative embodiments it was discovered that known remote direct memory access solutions are based on trial and error to tune how many data packets will be processed. Current implementations do not try to determine the number of data packets currently received by a remote direct memory access device, such as a network adapter. Current implementations basically allow user space tuning to determine whether more or fewer data packets have to be received before the data packets are sent to an application. This user space tuning leads to situations where at peak moments when the receive queue of the network adapter is almost full, the current implementations still only request the fixed number of data packets be delivered to the application. Or, where at slower moments when the receive queue is almost empty, the current implementations wait to receive the fixed number of data packets before delivery to the application, thus increasing latency.

As a result, illustrative embodiments do not focus on the sending data processing system, because a sending application will try to post as many buffers in a receive queue of a network adapter associated with a receiving data processing system as the sending application is able to. Instead, illustrative embodiments focus on the receiving data processing system to keep a balance between the number of data packets that can be processed from the receive queue of the a network adapter associated with the receiving data processing system and the number of data packets that should be delivered to an application calling for the data packets in the receiving data processing system. Illustrative embodiments overcome this balancing problem by identifying the number of data packets currently in the receive queue and then deciding how to process these data packets.

Illustrative embodiments query the network adapter to determine the number of data packets the network adapter has currently received in the network adapter's receive queue. For example, once an interrupt has been received from the network adapter to indicate that data packets are in the receive queue, illustrative embodiments query the number of data packets currently in the receive queue. Based on the number of data packets in the receive queue and regardless of the number of data packets called for by the user application, illustrative embodiments will process the data packets according to how busy or full the network adapter's receive queue is. Then, illustrative embodiments will deliver the number of data packets that the user application requested along with information regarding how many data packets in excess of the number of data packets requested by the user application were pre-fetched from the receive queue during the same data packet retrieval cycle, if any. Illustrative embodiments save these pre-fetched data packets in a pre-fetched queue and will deliver these pre-fetched data packets to the requesting user application in a next or subsequent data packet retrieval cycle.

Thus, illustrative embodiments adjust the processing of the data packets based on the number of data packets currently received by the receive queue and the size of the receive queue. For example, if the number of the data packets in the receive queue relative to the size of the receive queue is small, then illustrative embodiments will retrieve a fewer number of data packets from the receive queue, delivering this fewer number of data packets faster to the calling application, thereby decreasing latency. If the number of data packets in the receive queue relative to the size of the receive queue is high, then illustrative embodiments will retrieve more data packets from the receive queue than are going to be delivered to the calling application in the current data packet retrieval cycle. Illustrative embodiments will save this excess number of data packets retrieved from the receive queue, but not expected by the calling application, in the pre-fetched queue. In addition, illustrative embodiments will send an indication to the calling application showing how many data packets to process from the pre-fetched queue during the next data packet retrieval cycle.

Thus, illustrative embodiments pre-process the receive queue buffers regardless of the user space tuning suggestions based on the illustrative embodiments knowing the number of data packets currently in the receive queue. The network adapter receive queue works by either allowing the user application to request data packets or by enabling an interrupt once data packet are received by the receive queue. Then, illustrative embodiments retrieve the data packets from the receive queue and post more receive queue buffers to allow for the receiving of new data packets.

With reference now to FIG. 3, a diagram illustrating an example of sending data packets from a sending data processing system to a receiving data processing system using remote direct memory access is depicted in accordance with an illustrative embodiment. Remote direct memory access system 300 may be implemented in, for example, network data processing system 100 in FIG. 1.

Remote direct memory access system 300 includes sending data processing system 302 and receiving data processing system 304. Sending data processing system 302 and receiving data processing system 304 may be implemented in, for example, data processing system 200 in FIG. 2. Sending data processing system 302 includes user application queue 306 and remote direct memory access device 308. Receiving data processing system 304 includes user application queue 310, remote direct memory access device 312, and remote direct memory access controller 314.

User application queue 306 is a send work queue of an application running in a user space of sending data processing system 302. The running application may be, for example, any type of software program, such as a financial data feed application that provides time sensitive information to a plurality of client devices, such as clients 110-114 in FIG. 1. Remote direct memory access device 308 and remote direct memory access device 312 provide the remote direct memory access capabilities of sending data processing system 302 and receiving data processing system 304, respectively. Remote direct memory access device 308 and remote direct memory access device 312 may be, for example, remote direct memory access device 210 in FIG. 2. Remote direct memory access device 308 connects sending data processing system 302 to remote direct memory access device 312 of receiving data processing system 304 via network 316. Network 316 may be, for example, network 102 in FIG. 1. Remote direct memory access device 308 and remote direct memory access device 312 may be, for example, network input/output cards, network input/output adapters, network interface cards, network interface controllers, or any combination thereof. Remote direct memory access device 308 may communicate with remote direct memory access device 312 using, for example, InfiniBand, remote direct memory access-over-Ethernet, remote direct memory access-over-internet protocol (IP), or virtual interface (VI).

User application queue 306 sends outgoing data to remote direct memory access device 308 for remote direct memory access transmission of the outgoing data to receiving data processing system 304. Upon receiving the outgoing data from user application queue 306, remote direct memory access device 308 packages the outgoing data into packets and then places the data packets into buffers associated with send queue 318 for subsequent transmission via network 316 to receiving data processing system 304. Transmission of the data packets is from send queue 318 associated with remote direct memory access device 308 to receive queue 320 associated with remote direct memory access device 312. Receive queue 320 may comprise, for example, 32,000 buffers for receiving data packets, one data packet per buffer.

Upon receiving the data packets in receive queue 320, remote direct memory access device 312 issues an interrupt indicating that data packets are currently in receive queue 320 and ready for retrieval. Remote direct memory controller 314 queries remote direct memory access device 312 to determine the number of data packets currently received by receive queue 320. Remote direct memory controller 314 may be, for example, remote direct memory controller 220 in FIG. 2.

Remote direct memory controller 314 then transfers a predetermined number of data packets called for by a user application associated with user application queue 310 to user application queue 310 from receive queue 320. The user application may call for 128 data packets from receive queue 320 during one data packet retrieval cycle for example. User application queue 310 is a receive work queue of the user application running in a user space of receiving data processing system 304. The using application processes the data packets in user application queue 310 to extract the incoming data for use by receiving data processing system 304.

In addition, if remote direct memory controller 314 retrieves more data packets from receive queue 320 than are called for by the user application associated with user application queue 310 in the current data packet retrieval cycle, then remote direct memory controller 314 saves the excess data packets in pre-fetched queue 322, which is located within remote direct memory controller 314. Further, remote direct memory controller 314 sends an indication to the user application associated with user application queue 310 indicating that a number of data packets, which are saved in pre-fetched queue 322, are ready to be sent to the user application during the next data packet retrieval cycle.

Figure 4:
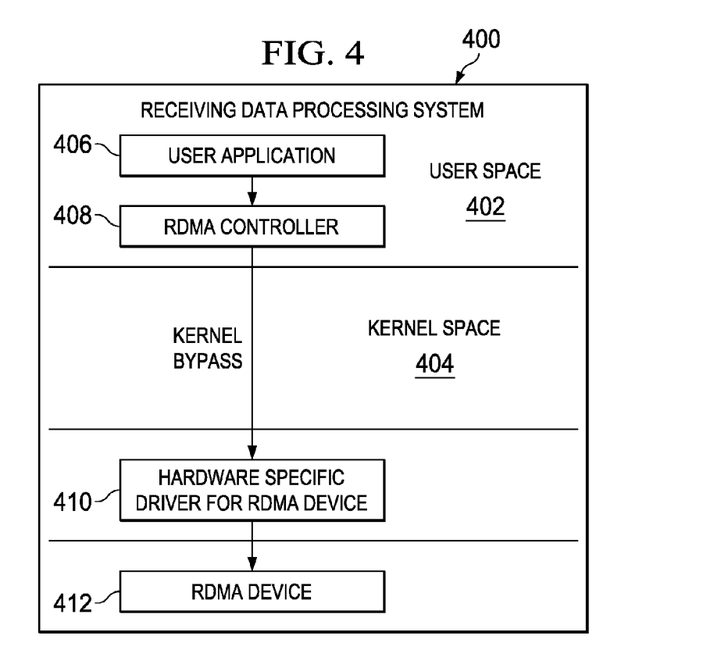
FIG. 4 is a diagram illustrating an example of a receiving data processing system in accordance with an illustrative embodiment.

With reference now to FIG. 4, a diagram illustrating an example of a receiving data processing system is depicted in accordance with an illustrative embodiment. Receiving data processing system 400 may be, for example, receiving data processing system 304 in FIG. 3. Receiving data processing system 400 includes user space 402 and kernel space 404.

Typically, a conventional computer operating system segregates memory in a user space and a kernel space. The user space is the memory area where user applications run and perform work. When a user application is to be run, the user application is copied from storage into the user space. The kernel space is reserved for running the kernel, kernel extensions, and most device drivers. The kernel is a program that constitutes the central core of the computer's operating system.

User space 402 includes user application 406 and remote direct memory access controller 408. User application 406 may be, for example, the user application associated with user application queue 310 in FIG. 3. User application 406 may be any type of software program.

Remote direct memory access controller 408 may be, for example, remote direct memory controller 314 in FIG. 3. Remote direct memory access controller 408 monitors and controls remote direct memory access operations associated with receiving data processing system 400. In this illustrative embodiment, remote direct memory access controller 408 bypasses the kernel in kernel space 404. However, is should be noted that in an alternative illustrative embodiment, remote direct memory access controller 408 may be located within kernel space 404 instead of or in addition to user space 402.

Remote direct memory access controller 408 controls hardware specific driver for the remote direct memory access device 410. In other words, in this illustrative embodiment kernel space 404 does not control hardware specific driver for the remote direct memory access device 410. Hardware specific driver for the remote direct memory access device 410 is the device driver for remote direct memory access device 412. Hardware specific driver for the remote direct memory access device 410 is a software program that allows user application 406 and/or remote direct memory access controller 408 to interact with remote direct memory access device 410. When a calling program, such as user application 406 or remote direct memory access controller 408, invokes a routine in hardware specific driver for the remote direct memory access device 410, hardware specific driver for the remote direct memory access device 410 issues commands to remote direct memory access device 412. In other words, hardware specific driver for the remote direct memory access device 410 acts as a translator between remote direct memory access device 412 and the calling programs that use remote direct memory access device 412. Remote direct memory access device 412 may be, for example, remote direct memory access device 312 in FIG. 3. In addition, remote direct memory access device 412 may be, for example, a network adapter.

Figure 5:
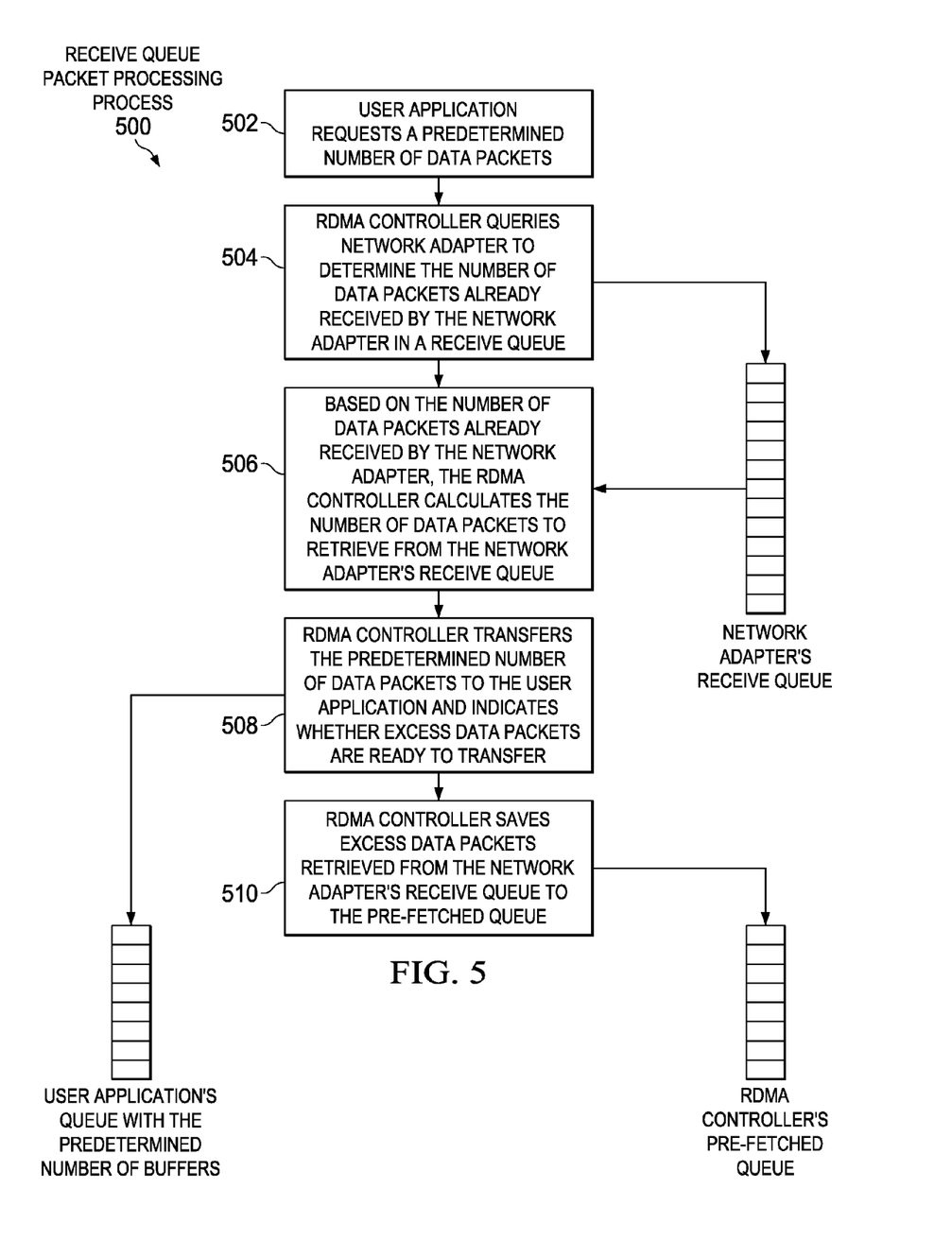
FIG. 5 is an example illustration of a receive queue data packet processing process in accordance with an illustrative embodiment.

With reference now to FIG. 5, an example illustration of a receive queue data packet processing process is depicted in accordance with an illustrative embodiment. Receive queue packet processing process 500 may be implemented in, for example, receiving data processing system 304 in FIG. 3 and receiving data processing system 400 in FIG. 4. Receive queue packet processing process 500 includes process steps 502, 504, 506, 508, and 510. However, it should be noted that receive queue packet processing process 500 is only intended as an example and not as a limitation on different illustrative embodiments. In other words, receive queue packet processing process 500 may include more or fewer process steps. For example, receive queue packet processing process 500 may modify, combine, delete, or add process steps.

At process step 502, a user application, such as user application 406 in FIG. 4, requests a predetermined number of data packets. The predetermined number of data packets may be for example, 128 data packets. However, it should be noted that the user application may request any number of data packets.

At process step 504, a remote direct memory access controller, such as remote direct memory access controller 314 in FIG. 3, queries a network adapter, such as remote direct memory access device 312 in FIG. 3, to determine the number of data packets already received by the network adapter in a receive queue, such as receive queue 320 in FIG. 3. At process step 506, based on the number of data packets already received by the network adapter, the remote direct memory access controller calculates the number of data packets to retrieve from the network adapter's receive queue.

At process step 508, the remote direct memory access controller transfers the predetermined number of data packets to the user application and indicates whether there are any excess data packets that are ready to transfer. At process step 510, the remote direct memory access controller saves the excess data packets retrieved from the network adapter's receive queue to a pre-fetched queue, such as pre-fetched queue 322 in FIG. 3. The remote direct memory access controller will transfer the excess data packets saved in the pre-fetched queue to the user application during the next data packet retrieval cycle.

Figure 6A:
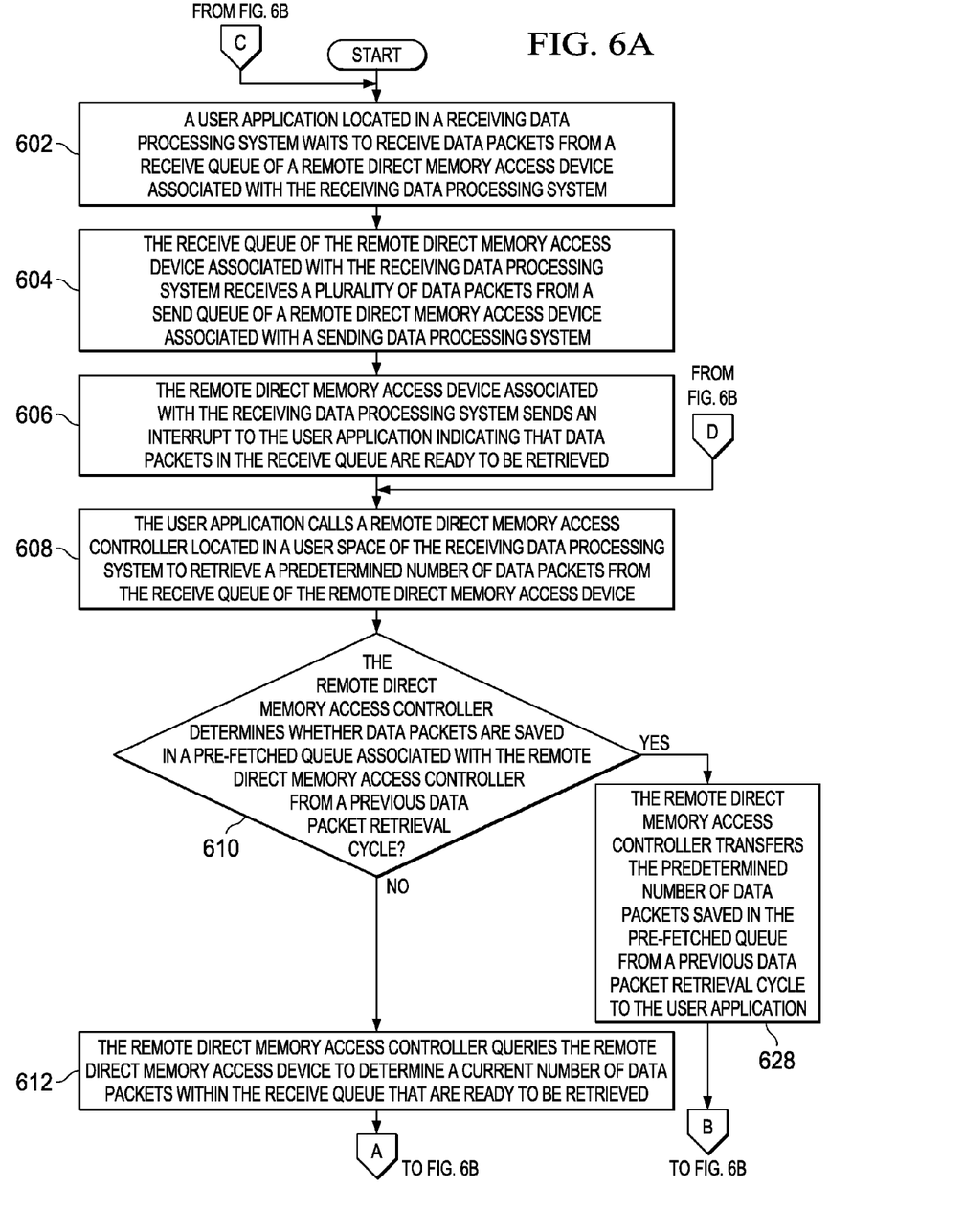
FIG. 6A and FIG. 6B are a flowchart illustrating a process for processing data packets from a receive queue in accordance with an illustrative embodiment.
Figure 6B:
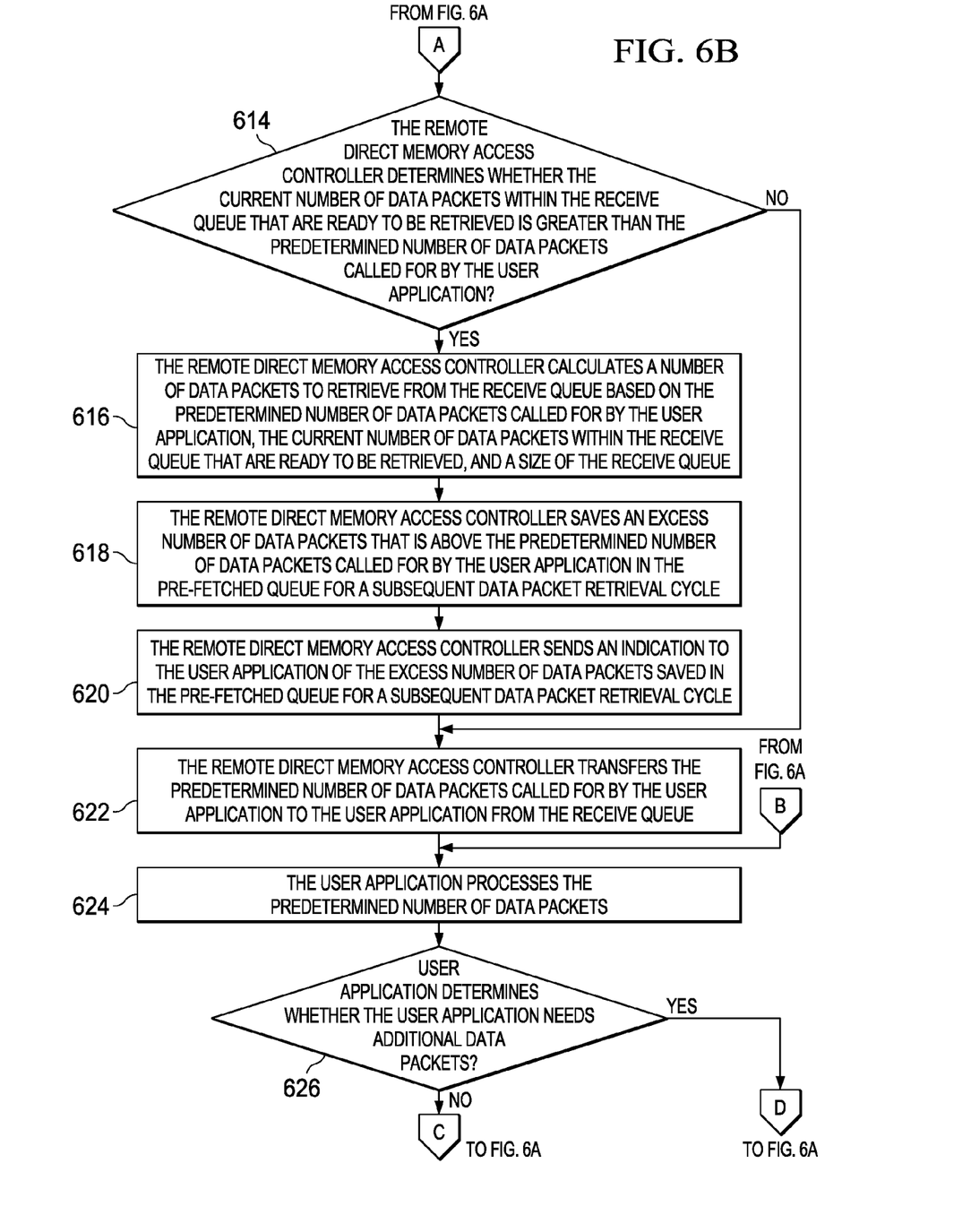

With reference now to FIG. 6A and FIG. 6B, a flowchart illustrating a process for processing data packets from a receive queue is shown in accordance with an illustrative embodiment. The process shown in FIG. 6A and FIG. 6B may be implemented in a receiving data processing system, such as, for example, receiving data processing system 304 in FIG. 3 and receiving data processing system 400 in FIG. 4.

The process begins when a user application, such as user application 406 in FIG. 4, located in the receiving data processing system waits to receive data packets from a receive queue of a remote direct memory access device associated with the receiving data processing system, such as receive queue 314 of remote direct memory access device 312 in FIG. 3 (step 602). The receive queue of the remote direct memory access device associated with the receiving data processing system receives a plurality of data packets from a send queue of a remote direct memory access device associated with a sending data processing system, such as send queue 318 of remote direct memory access device 308 associated with sending data processing system 302 in FIG. 3 (step 604).

Then, the remote direct memory access device associated with the receiving data processing system sends an interrupt to the user application indicating that data packets in the receive queue are ready to be retrieved (step 606). The user application calls a remote direct memory access controller located in a user space of the receiving data processing system to retrieve a predetermined number of data packets from the receive queue of the remote direct memory access device (step 608). The remote direct memory access controller may be, for example, remote direct memory access controller 408 located in user space 402 in FIG. 4. However, it should be noted that in alternative illustrative embodiments, the remote direct memory access controller may be located a kernel space, such as kernel space 404 in FIG. 4, instead of in the user space or may be located in both the user space and the kernel space.

The remote direct memory access controller determines whether data packets are saved in a pre-fetched queue associated with the remote direct memory access controller, such as pre-fetched queue 322 in FIG. 3, from a previous data packet retrieval cycle (step 610). If the remote direct memory access controller determines that data packets are not saved in the pre-fetched queue associated with the remote direct memory access controller from a previous data packet retrieval cycle, no output of step 610, then the remote direct memory access controller queries the remote direct memory access device to determine a current number of data packets within the receive queue that are ready to be retrieved (step 612).

Afterward, the remote direct memory access controller determines whether the current number of data packets within the receive queue that are ready to be retrieved is greater than the predetermined number of data packets called for by the user application (step 614). If the remote direct memory access controller determines that the current number of data packets within the receive queue that are ready to be retrieved is not greater than the predetermined number of data packets called for by the user application, no output of step 614, then the process proceeds to step 622. If the remote direct memory access controller determines that the current number of data packets within the receive queue that are ready to be retrieved is greater than the predetermined number of data packets called for by the user application, yes output of step 614, then the remote direct memory access controller calculates a number of data packets to retrieve from the receive queue based on the predetermined number of data packets called for by the user application, the current number of data packets within the receive queue that are ready to be retrieved, and a size of the receive queue (step 616).

In addition, the remote direct memory access controller saves an excess number of data packets that is above the predetermined number of data packets called for by the user application in the pre-fetched queue for a subsequent data packet retrieval cycle (step 618). Further, the remote direct memory access controller sends an indication to the user application of the excess number of data packets saved in the pre-fetched queue for a subsequent data packet retrieval cycle (step 620). Furthermore, the remote direct memory access controller transfers the predetermined number of data packets called for by the user application to the user application from the receive queue (step 622).

Then, the user application processes the predetermined number of data packets (step 624). In addition, the user application determines whether the user application needs additional data packets (step 626). If the user application determines that the user application does need additional data packets, yes output of step 626, then the process returns to step 608 where the user application calls the remote direct memory access controller to retrieve the predetermined number of data packets from the receive queue of the remote direct memory access device. If the user application determines that the user application does not need additional data packets, no output of step 626, then the process returns to step 602 where the user application waits.

Returning again to step 610, if the remote direct memory access controller determines that data packets are saved in the pre-fetched queue associated with the remote direct memory access controller from a previous data packet retrieval cycle, yes output of step 610, then the remote direct memory access controller transfers the predetermined number of data packets saved in the pre-fetched queue from a previous data packet retrieval cycle to the user application (step 628). Thereafter the process returns to step 624 where the user application processes the predetermined number of data packets.

Figure 7:
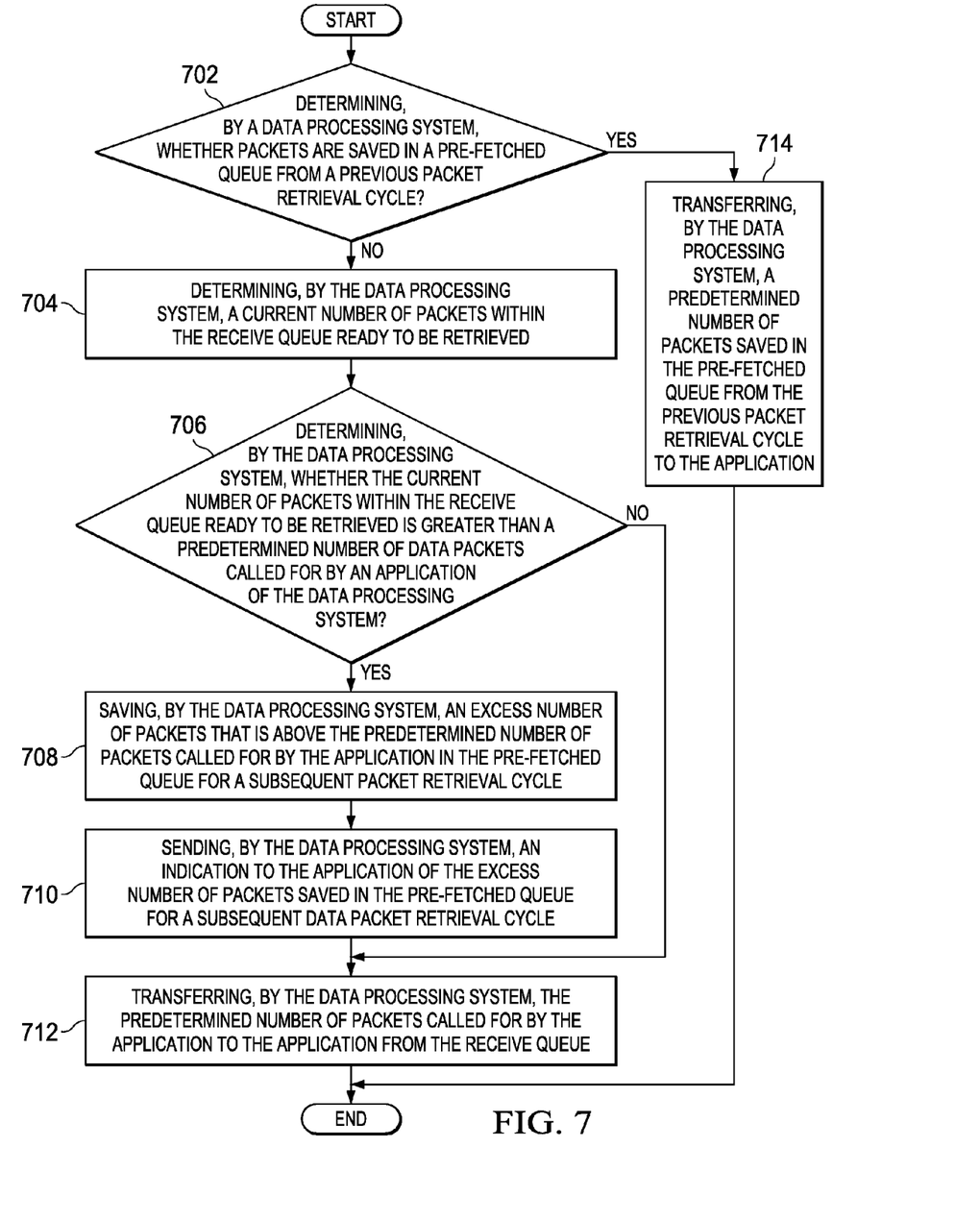
FIG. 7 is a flowchart illustrating a process for transferring packets to an application in accordance with an illustrative embodiment.

With reference now to FIG. 7, a flowchart illustrating a process for transferring packets to an application is shown in accordance with an illustrative embodiment. The process shown in FIG. 7 may be implemented in a data processing system, such as, for example, data processing system 200 in FIG. 2.

The process begins when the data processing system determines whether packets are saved in a pre-fetched queue, such as pre-fetched queue 322 in FIG. 3, from a previous packet retrieval cycle (step 702). If the data processing system determines that packets are not saved in the pre-fetched queue from a previous data packet retrieval cycle, no output of step 702, then the data processing system determines a current number of packets within the receive queue ready to be retrieved (step 704).

Subsequently, the data processing system determines whether the current number of packets within the receive queue ready to be retrieved is greater than a predetermined number of packets called for by an application of the data processing system (step 706). If the data processing system determines that the current number of packets within the receive queue ready to be retrieved is not greater than the predetermined number of packets called for by the application, no output of step 706, then the process proceeds to step 712. If the data processing system determines that the current number of packets within the receive queue ready to be retrieved is greater than the predetermined number of packets called for by the application, yes output of step 706, then the data processing system saves an excess number of packets that is above the predetermined number of packets called for by the user application in the pre-fetched queue for a subsequent packet retrieval cycle (step 708).

In addition, the data processing system sends an indication to the application of the excess number of packets saved in the pre-fetched queue for a subsequent packet retrieval cycle (step 710). Further, the data processing system transfers the predetermined number of packets called for by the application to the application from the receive queue (step 712). Thereafter the process terminates.

Returning again to step 702, if the data processing system determines that packets are saved in the pre-fetched queue from a previous packet retrieval cycle, yes output of step 702, then the data processing system transfers a predetermined number of packets saved in the pre-fetched queue from the previous packet retrieval cycle to the application (step 714). Thereafter the process terminates.

Thus, illustrative embodiments of the present invention provide a computer implemented method, data processing system, and computer program product for processing data packets from a receive queue in a remote direct memory access device, such as a network input/output adapter. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for processing packets from a receive queue of a remote direct memory access device in a data processing system, the computer implemented method comprising:
   determining, by the data processing system using a remote direct memory access controller software program located in a user space, whether packets are saved in a pre-fetched queue located within the remote direct memory access controller software program that stores an excess number of packets above a predetermined number of packets called for by an application of the data processing system in a previous packet retrieval cycle, wherein the remote direct memory access controller software program located in the user space monitors and controls remote direct memory access operations associated with the remote direct memory access device;
   responsive to the data processing system determining that packets are not saved in the pre-fetched queue located within the remote direct memory access controller software program that stores the excess number of packets above the predetermined number of packets called for by the application in the previous packet retrieval cycle, determining, by the data processing system using the remote direct memory access controller software program, a current number of packets within the receive queue of the remote direct memory access device ready to be retrieved;
   responsive to the data processing system determining the current number of packets within the receive queue of the remote direct memory access device ready to be retrieved, determining, by the data processing system using the remote direct memory access controller software program, whether the current number of packets within the receive queue of the remote direct memory access device ready to be retrieved is greater than a predetermined number of packets called for by the application of the data processing system;
   responsive to the data processing system determining that the current number of packets within the receive queue of the remote direct memory access device ready to be retrieved is greater than the predetermined number of packets called for by the application, saving, by the data processing system using the remote direct memory access controller software program, the excess number of packets above the predetermined number of packets called for by the application in the pre-fetched queue located within the remote direct memory access controller software program for a subsequent packet retrieval cycle;
   sending, by the data processing system using the remote direct memory access controller software program, an indication to the application of the excess number of packets saved in the pre-fetched queue located within the remote direct memory access controller software program for the subsequent packet retrieval cycle; and
   transferring, by the data processing system using the remote direct memory access controller software program, the predetermined number of packets called for by the application to the application from the receive queue of the remote direct memory access device.

2. The computer implemented method of claim 1 further comprising:
   responsive to the data processing system determining that packets are saved in the pre-fetched queue located within the remote direct memory access controller software program that stores the excess number of packets above the predetermined number of packets called for by the application in the previous packet retrieval cycle, transferring, by the data processing system using the remote direct memory access controller software program, the predetermined number of packets saved in the pre-fetched queue from the previous packet retrieval cycle to the application.

3. The computer implemented method of claim 1 further comprising:
   calculating, by the data processing system using the remote direct memory access controller software program, a number of packets to retrieve from the receive queue of the remote direct memory access device based on the predetermined number of packets called for by the application, the current number of packets within the receive queue of the remote direct memory access device ready to be retrieved, and a size of the receive queue of the remote direct memory access device.

4. The computer implemented method of claim 1, wherein the remote direct memory access device is one of a network input/output card, a network input/output adapter, a network interface card, or a network interface controller.

5. The computer implemented method of claim 1, wherein the data processing system using the remote direct memory access controller software program queries the remote direct memory access device to determine the current number of packets within the receive queue of the remote direct memory access device ready to be retrieved.

6. The computer implemented method of claim 1, wherein the data processing system is a receiving data processing system that receives data packets via a network from a remote sending data processing system using a remote direct memory access protocol.

7. The computer implemented method of claim 6, wherein the remote direct memory access protocol is one of Infini-Band, remote direct memory access-over-Ethernet, remote direct memory access-over-internet protocol, or virtual interface.

* * * * *